US011799750B1

(12) United States Patent
Prasad et al.

(10) Patent No.: US 11,799,750 B1
(45) Date of Patent: Oct. 24, 2023

(54) SYSTEMS AND METHODS FOR HPACK TABLE RESTORATION

(71) Applicant: NetScout Systems, Inc., Westford, MA (US)

(72) Inventors: Sandeep Prasad, San Jose, CA (US); Abhishek Saraswati, San Jose, CA (US); Vijayalakshmi Seshadri, San Jose, CA (US); Pritish Aherrao, Prune (IN); Massimiliano Frigieri, Modena (IT); Loreto DiResta, Modena (IT); Linda Nasi, Modena (IT); Tauras Liubinskas, Frankfurt, KY (US)

(73) Assignee: Netscout Systems, Inc., Westford, MA (US)

( * ) Notice: Subject to any disclaimer, the term of this patent is extended or adjusted under 35 U.S.C. 154(b) by 0 days.

(21) Appl. No.: 18/155,341

(22) Filed: Jan. 17, 2023

(30) Foreign Application Priority Data

Dec. 2, 2022 (IN) .............................. 202241069616

(51) Int. Cl.
*H04L 43/12* (2022.01)
*H04L 69/22* (2022.01)
*H04L 45/745* (2022.01)

(52) U.S. Cl.
CPC ............ *H04L 43/12* (2013.01); *H04L 45/745* (2013.01); *H04L 69/22* (2013.01)

(58) Field of Classification Search
CPC ....... H04L 43/12; H04L 45/745; H04L 69/22; H04W 12/0017
See application file for complete search history.

(56) References Cited

U.S. PATENT DOCUMENTS

2019/0147100 A1* 5/2019 Li .......................... G06F 16/211
706/61
2019/0363843 A1* 11/2019 Gordaychik .............. H04L 1/08

* cited by examiner

*Primary Examiner* — Michael Won
(74) *Attorney, Agent, or Firm* — Foley & Lardner LLP

(57) ABSTRACT

A method for restoring an HPACK table is disclosed. A static table is maintained. Control plane signaling data packets are collected via a probe. A dynamic table is generated from the control plane signaling data packets. An event affecting operation of the probe may be detected. A first control plane signaling data packet may be collected by the probe subsequent to detection of the event. The dynamic table may be reorganized. The reorganized dynamic table may be stored in memory.

20 Claims, 8 Drawing Sheets

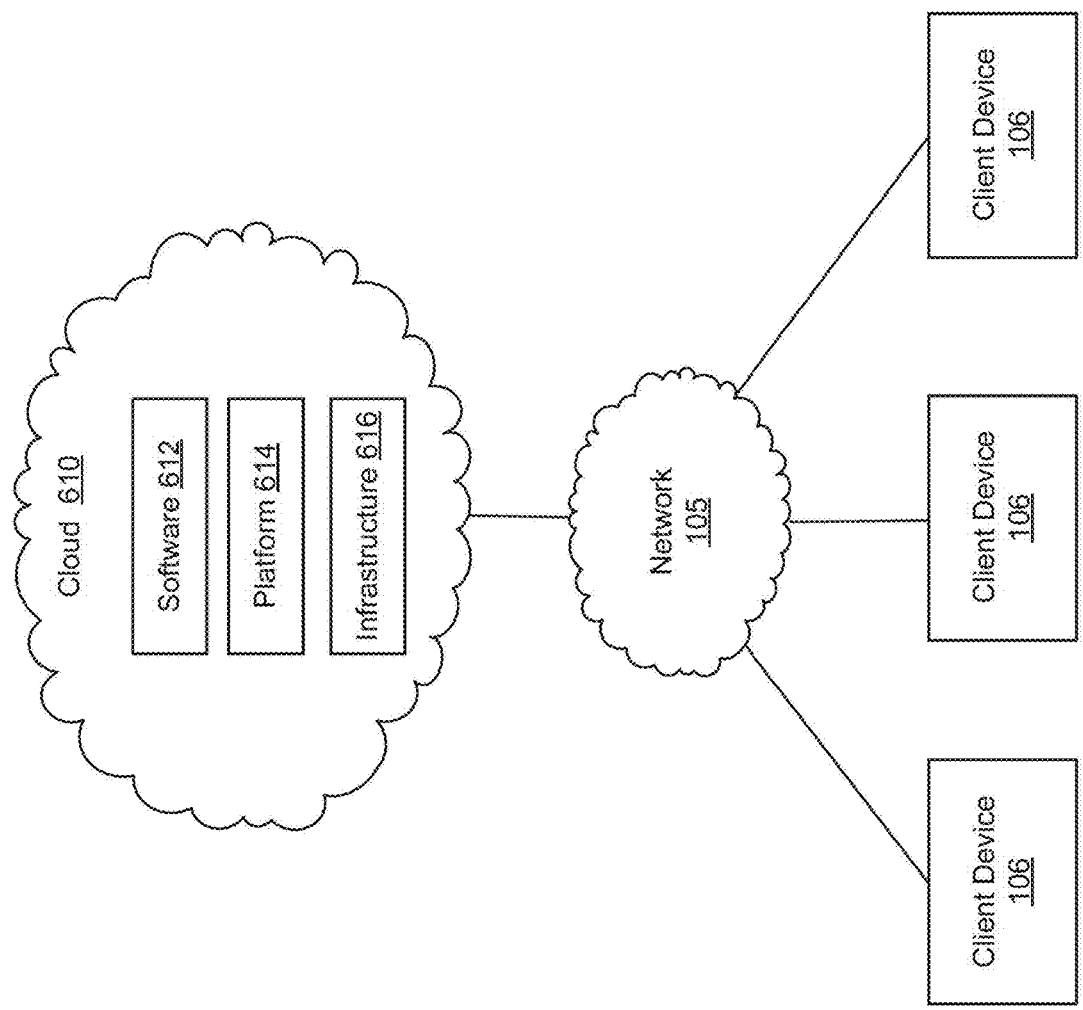

SYSTEMS AND METHODS FOR HPACK TABLE RESTORATION

CROSS-REFERENCE TO RELATED APPLICATION

This application claims the benefit of priority to Indian Provisional Application No. 202241069616, filed Dec. 2, 2022, the entirety of which is incorporated by reference herein.

BACKGROUND 5G system architecture may facilitate service-based interaction between control plane network functions (NF). Network functions within the 5GC control plane may use service-based interfaces for their interactions. Such service-based interfaces may utilize an HTTP/2 protocol as an application layer serialization protocol. The HTTP/2 protocol may implement HPACK for compression and encoding of header field values.

HPACK encoders map header field values to index values. HPACK encoders may use two tables for associating indexes, a static table and a dynamic table. The list of header field values is indexed in the dynamic table and maintained in a first-in-first-out (FIFO) format. The indexes of the dynamic table may be dynamic in nature and may be updated as new entries are added to the table. The dynamic tables may be maintained by end points. Dynamic table mappings of literals to indexes may not be shared over the connection. Accordingly, to decipher HTTP/2 messages, it is important for sender and receiver dynamic tables to be synchronous with each other during communication sessions.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6B is a block diagram depicting a cloud computing environment including a client device in communication with cloud service providers.

DETAILED DESCRIPTION

Figure 1:
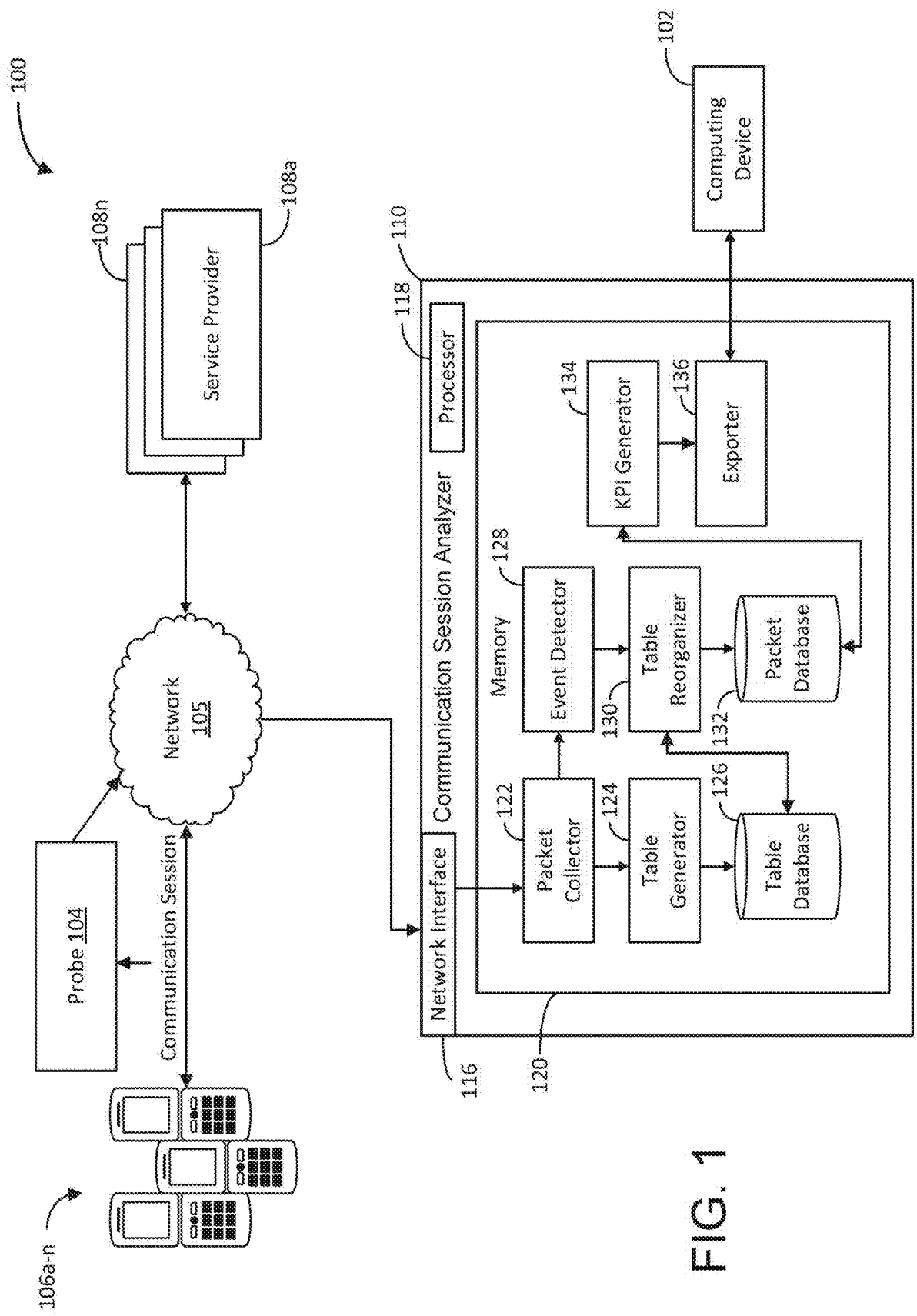
FIG. 1 is an illustration of a system for HPACK table restoration, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A network monitoring system may have difficulties monitoring a communication session between nodes using an HPACK compression protocol. For example, the networking monitoring system may include or implement a probe that monitors network conversations between nodes. The network monitoring system itself may not communicate directly with the nodes of the network conversations. The nodes of the communication network may each maintain and dynamically update HPACK tables (e.g., dynamic tables) for communication sessions the nodes have between each other as the nodes transmit messages between each other. Because such updates are based on data in the data packets, the dynamic tables the network monitoring system maintains may lose synchronization with the dynamic tables the nodes maintain when the probe experiences an event (e.g., reboots or shuts down) or otherwise loses its ability to collect data packets from the communication sessions for any period of time. Due to the dynamic nature of such tables, changing based on data packets that are transmitted between two nodes of a communication session, one missed data packet from a communication session may hamper the network monitoring system's ability to parse the data in the data packets for the communication session. For example, when the probe loses connection to a communication session between two nodes, the two nodes may continue exchanging data packets and updating their respective tables to use for compressing and decompressing headers in the data packets. Accordingly, when the probe reconnects with the communication session, the probe may collect data packets, and the network monitoring system may not be able to accurately decompress data packets the two nodes communicate between each other.

A computer implementing the systems and methods described herein may overcome the aforementioned technical deficiencies. Upon detecting an event (e.g., a reboot or a shutdown of the probe) and receiving data packets from the probe again, the computer may operate to reorganize the table according to new data packets the computer receives from the communication session. To do so, the computer may analyze the contents (e.g., payloads and/or field values) of the data packets according to one or more heuristics to identify the correct header field values for index values in the same data packets. The computer may update the dynamic table for the communication session based on the determined header field values and the index values that correspond to the header field values. The computer may concurrently update the dynamic table for each data packet the probe retrieves that includes an identifier indicating to add a new header field value to the dynamic database. The computer may add the new header field values to the dynamic table while using heuristics to identify the header field values that correspond to other index values in the dynamic table. The computer may decompress the header field values using the reorganized or updated table to generate KPIs.

FIG. 1 illustrates an example system 100 for HPACK table restoration, in some embodiments. The system 100 may provide improved network monitoring of a network using HPACK compression. In brief overview, the system 100 can include a probe 104 that receives and/or stores data packets transmitted via a network 105 between client devices 106a-n (hereinafter client device 106 or client devices 106) and service providers 108a-n (hereinafter service provider 108 or service providers 108). The service providers 108 can each include a set of one or more servers 602, depicted in FIG. 6A, or a data center 608. System 100 can also include a communication session analyzer 110 that can communicate or interface with the probe 104 and/or a client device 102, either directly or via the network 105, to generate KPIs regarding communication sessions between client devices 106 and service providers 108. Communication session analyzer 110 can collect data from the probe 104 and generate KPIs regarding communication sessions between the client devices 106 and the service providers 108. Communication session analyzer 110 can display the key performance indicators at the client device 102 and/or transmit the key performance indicators to the service providers 108.

The probe 104, the client devices 106, the service providers 108, the client device 102, and/or the communication session analyzer 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions provided by service providers 108 or otherwise communicate with the servers of the service providers 108 for data. In some embodiments, network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the probe 104, the client devices 106, the service providers 108, the client device 102, and/or the communication session analyzer 110 can include or utilize at least one processing unit or other logic device such as programmable logic array engine, or module configured to communicate with one another or other resources or databases. The components of the probe 104, the client devices 106, the service providers 108, the client device 102, and/or the communication session analyzer 110 can be separate components or a single component. System 100 and its components can include hardware elements, such as one or more processors, logic devices, or circuits.

Still referring to FIG. 1, and in further detail, system 100 can include the service providers 108. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network, and is also referred to as a communications network service. Examples of services include 5G broadband services, any voice, data or video service provided over a network, smart-grid network, digital telephone service, cellular service, Internet protocol television (IPTV), etc.

Client devices 106 can include or execute applications to receive data from the service providers 108. For example, a client device 106 may execute a video application upon receiving a user input selection that causes the client device 106 to open the video application on the display. Responsive to executing the video application, a service provider 108 associated with the video application may stream a requested video to the client device 106 in a communication session. In another example, a client device 106 may execute a video game application. Responsive to executing the video game application, a service provider 108 associated with the video game application may provide data for the video game application to the client device 106. The client devices 106 may establish communication sessions with the service providers 108 for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the service providers 108 can still be retrieved by probe 104 from the network 105. The client device 102 may be similar to client devices 106. In some cases, the probe 104, the client devices 106, and/or the communication session analyzer 110 can be deployed in the cloud 610 on the same computing host in an infrastructure 616 (described below with respect to FIG. 6).

As service providers 108 provide or transmit data in communication sessions to client devices 106, the probe 104 may intercept or otherwise monitor the control plane signaling data (e.g., control plane signaling data packets) of the communication sessions. The probe 104 may comprise one or more processors that are connected to a network equipment manufacture (NEM) trace port of network 105. In some embodiments, the probe 104 may collect control plane signaling data at an Evolved Packet Core interface (e.g., the S1-MME interface or the S6a interface) of the network 105. The control plane signaling data may include geographical location data (e.g., cell tower triangulation data or global positioning system data) of the client devices 106 as client devices 106 receive data and/or transmit, a cell identifier identifying the cell in which the respective client device 106 was located while transmitting or receiving the data, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc. The probe 104 may receive such data and forward the data to the communication session analyzer 110 over the network 105 for further processing.

Communication session analyzer 110 may comprise one or more processors that are configured to receive control plane signaling data and generate KPI data from the received control plane signaling data. The communication session analyzer 110 may comprise a network interface 116, a processor 118, and/or memory 120. Communication session analyzer 110 may communicate with any of the client device 102, the probe 104, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

Memory 120 may include a packet collector 122, a table generator 124, a table database 126, an event detector 128, a table reorganizer 130, a packet database 132, a KPI generator 134, and an exporter 136, in some embodiments. In brief overview, the components 122-136 may maintain and update a table to decompress headers of data packets (e.g., control plane signaling data packets) of the control plane signaling data collected by probe, which may be compressed using an HPACK compression format. In instances in which the probe shuts down or resets, the components 122-136 may update the table in real-time based on data packets the probe collects upon coming back online. The components 122-136 may generate KPIs from the control plane signaling data using the updated table. In some embodiments, the components 122-136 may transmit the KPIs to the client device 102 in response to a request from the client device 102.

The packet collector 122 may comprise programmable instructions that, upon execution, cause the processor 118 to receive or collect data (e.g., control plane signaling data packets) from the probe 104. The packet collector 122 may collect control plane signaling data from the probe 104. The packet collector 122 may collect data by polling or receiving data from the probe 104. The packet collector 122 may poll or receive data from the probe 104 at set intervals or pseudo-randomly. Upon receiving such data, the packet collector 122 may transmit the data to the table generator 124.

The packet collector 122 may store data packets and/or content of the data packets in memory (e.g., the memory 120). In some embodiments, the packet collector 122 stores the data packets in the packet database 132. The packet database 132 may be a database (e.g., a relational database) that stores data packets and/or values the packet collector 122 extracted from the data packets. The packet collector 122 may extract all data or specific data (e.g., data the packet collector 122 identifies in the data packets according to a set of rules) from each data packet and store the extracted data in the packet database 132. In some embodiments, the packet collector 122 stores the entire data packets in the packet database 132. The packet collector 122 may store such data packets from multiple communication sessions between different nodes. In doing so, the packet collector 122 may store identifiers (e.g., strings) of nodes involved in the communication session with the respective data packets and/or for the communication sessions themselves. In some embodiments, the packet collector 122 may store the data packets and/or data extracted from the data packets in memory instead of the packet database 132. The KPI generator 134 may retrieve the data packets and/or the data extracted from the data packets from the packet database 132 and/or memory. The KPI generator 134 may do so to generate KPIs and/or alerts from the data on a per communication session or device (e.g., based on the stored identifiers associated with the communications and/or devices in the data) basis and/or based on an aggregation of data across multiple communication sessions.

The table generator 124 may comprise programmable instructions that, upon execution, cause the processor 118 to generate tables for an HPACK compression protocol. The HPACK compression protocol may be a header compression protocol that reduces the size of headers in data packets that are transmitted via a communication protocol, such as HTTP/2. The HPACK compression protocol may involve maintaining a table that includes index values that correspond to different header field values. Each index value in the table may correspond to a different header field. Two nodes (e.g., a client device 106 and a service provider 108) may communicate with each other in a communication session via a communication channel. The two nodes may each store a version of a table for the communication session when implementing the HPAC compression protocol. When transmitting data packets across the communication session, the nodes may include index values from the table in the headers of the data packets. The nodes may include the index values instead of (e.g., in place of) the header field values of the data packets that the nodes would have otherwise included in the data packets. Because the index values include fewer characters than the typical header field values, including the index values in the headers of the data packets instead of the header field values can reduce the overall size of data packets. Because messages transmitted over a communication session may include thousands to millions of data packets, the reduction in size in the header achieved through the HPACK compression protocol may substantially reduce the bandwidth required for communication session, reducing the latency of the communication session in the process. Additionally, the HPACK compression protocol may act as a safeguard for eavesdroppers or malicious entities seeking to sniff the data packets transmitted across the communication network.

The table generator 124 may generate a static table and a dynamic table for the HPACK communication session. The table generator 124 may generate the static table to have a set of predefined entries that include index values in sequential order as well as header field values that correspond to the index values. The static table may have a defined size (e.g., 61 entries) and may not change during the course of the communication session. In some embodiments, the static table may be the same for each communication session for which the communication session analyzer 110 analyzes communication between nodes.

The dynamic table may be a set of entries that the table generator 124 generates and updates in real-time as the probe 104 retrieves data packets from the communication session and transmits the data packets to the communication session analyzer 110 for processing. The dynamic table may be appended to the end of the static table and have index values that begin immediately sequentially after index values of the static table (e.g., if the static table includes 61 index values, the first index value of the dynamic table may be 62). The table generator 124 may identify new header field values to add to the dynamic table based on an identifier in the headers of the data packets (e.g., the headers may begin with a "01" 2-bit pattern). Upon identifying such an identifier, the table generator 124 may identify a string (e.g., a literal) that follows the identifier and insert the string at the beginning of the dynamic table to correspond to a first index value of the dynamic table. In doing so, the table generator 124 may increase or increment the index values of any preexisting index values and corresponding header field values in the dynamic table. The table generator 124 may continue to update the dynamic table in this manner over the course of the communication session.

The dynamic table may have a fixed size (e.g., 195). The fixed size may be defined by an administrator. The table generator 124 may add header field values to the beginning of the dynamic table over time, increasing the number of index values and corresponding header field values in the dynamic table for each added header field value until the dynamic table has a size matching the fixed size. Upon adding a header field value to the beginning of the dynamic table after the dynamic table reaches the fixed size, the table generator 124 may identify the highest index value in the dynamic table and remove the header field that corresponds to the highest index value, in some cases with the highest index value. The table generator 124 may increase the index values that correspond to the other header field values of the dynamic table accordingly. In this way, the table generator 124 may cause the dynamic table to maintain its fixed size over the course of the communication session.

The table database 126 may be a database (e.g., a relational database), a cache, or another location in memory. The table database 126 may store tables for communication sessions of nodes that are implementing the HPACK compression protocol. The table database 126 may store such tables for each communication session between a client device 106 and a service provider 108. As the devices of the communications communicate with each other and the probe 104 pulls data packets from the communication sessions, the table generator 124 may update the respective tables in memory. In doing so, the communication session analyzer 110 may maintain up-to-date tables for each ongoing communication session. Such tables may be used to decode or decompress headers to determine or generate KPIs.

The event detector 128 may comprise programmable instructions that, upon execution, cause the processor 118 to detect events that occur at the probe 104. Events may be any event that affects the ability of the probe 104 to collect data packets from a communication session across a communication channel. Examples of such events include, but are not limited, a disconnection of the probe from the communication channel or the network 105, a shutdown (e.g., a manual or automatic shutdown) of the probe 104, and a reboot of the probe 104. The event detector 128 may detect the event by receiving an indication of the event from the probe 104 or a computing device in communication with the communication session analyzer 110. In some cases, the event detector 128 may determine the event. For example, the event detector 128 may maintain a counter or a timer for the communication session. The event detector 128 may start or restart the count of the counter or the time of the timer after receipt of each data packet for the communication session. The event detector 128 may detect an event responsive to determining the counter or the timer for the communication session reaches or exceeds a threshold. The event detector 128 may similarly maintain and operate such timers and/or counters for each communication session from which the probe 104 or other probes are collecting data packets. Because the two nodes can still communicate across the communication session while the probe 104 is experiencing the event, the event may cause the probe 104 miss collection of data packets that are transmitted between the two nodes during the time period in which the probe 104 is affected by the event. Thus, the event may cause the dynamic table for the communication session between the two nodes to be asynchronous with the dynamic tables maintained by the two nodes (e.g., the two nodes may increment the dynamic tables the two nodes maintain one or any number of times without the table generator 124 making any corresponding updates).

The table reorganizer 130 may comprise programmable instructions that, upon execution, cause the processor 118 to reorganize the dynamic table for the communication session between the two nodes subsequent to the event. The table reorganizer 130 may reorganize the table subsequent and/or responsive to the event detector 128 detecting the event. The table reorganizer 130 may reorganize the table in real-time based on data packets the probe 104 collects from the communication channel between the two nodes. For example, subsequent to the event (e.g., subsequent to detecting of the event), the table reorganizer 130 may receive data packets that include index values within the dynamic table. The table reorganizer 130 may identify the index values for different header field values (e.g., values for method, path, content length, content type, status, or location header fields) of the data packets and apply one or more heuristics or policies to the content (e.g., the payloads and/or other fields) of the data packets. Based on the application of the heuristics, the table reorganizer 130 can determine header field values that correspond to the index values in the data packets. Header field values can be values in a header for a method field, a path field, a content-length field, a content-type field, a status field, or a location-header field. The table reorganizer 130 can identify the header field values in the dynamic table and insert the determined header field values into the dynamic table. Accordingly, for any future data packets from the communication session that contain the index values that correspond to the determined header field values, the communication session analyzer 110 can identify the header field values from the dynamic table based on the index values in the headers instead of reapplying any heuristics to the content of the data packets. In this way, the communication session analyzer 110 may conserve processing resources as the communication session analyzer 110 receives and parses thousands of data packets for different communication sessions between nodes.

Applying heuristics to data packets may include comparing the values and/or sizes of the payloads of the data packets with heuristics the communication session analyzer 110 stores in memory. The heuristics may each be or include a template of stored values or character or word sizes. Each heuristic may correspond to a specific header field value. Upon receiving a data packet from the communication session between the two nodes that includes an index value in the header (e.g., responsive to determining the index value is higher than any index value in the static table), the table reorganizer 130 may identify the characters and values in a payload of the data packet or calculate a character or word size (e.g., length) of the payload. The table reorganizer 130 may calculate the character or word size of the payload by maintaining and incrementing one or more counters for the number of characters and/or words in the payload. The table reorganizer 130 can compare the identified characters, values, and/or calculated character or word sizes of the payload to the heuristics. Upon determining at least one of the heuristics is satisfied, the table reorganizer 130 may identify the header field value that corresponds to the satisfied heuristic (e.g., select a header field value of the satisfied heuristics from a plurality of header field values of a plurality of heuristics the table reorganizer 130 applied to the content). The table reorganizer 130 may determine the index value in the header of the data packet corresponds to the identified header field value. The table reorganizer 130 may insert the identified header field value into the dynamic table for the communication session at the index value in the data packet. In some cases, the table reorganizer 130 may remove a current header field value at the index value in the dynamic table, replacing the current header field value with the identified header field value. The table reorganizer 130 may repeat this process for each data packet the communication session analyzer 110 receives from the probe 104 subsequent to the event.

In some cases, the table reorganizer 130 may only repeat this process for each data packet that includes an index value in the header of the data packet that the table reorganizer 130 has not correlated or associated with a header field value in the dynamic table for the communication session. For example, upon receiving a data packet with an index value in the header, the data processing system may query the dynamic table to determine if the table reorganizer 130 has determined a header field value for the index value subsequent to the event. Responsive to determining the table reorganizer 130 has not determined a header field value for the index value subsequent to the event, the table reorganizer 130 may apply heuristics to the content of the data packet to determine a header field value for the index value. Otherwise, the table reorganizer 130 may not apply heuristics to the content of the data packet.

In some embodiments, the table reorganizer 130 may reorganize the dynamic table by generating a new version of the dynamic table (e.g., a new data structure or list separate from the dynamic table the table generator 124 generated for the communication session prior to the event). For example, subsequent to the event, the table reorganizer 130 may retrieve the dynamic table for the communication session between the two nodes from the table database 126. Each of the header field values of the dynamic table may be "old" header field values that were previously correlated with different index values within the dynamic table in an old dynamic table or an old version of the dynamic table the table reorganizer 130 generated prior to the event (e.g., prior to detecting the event). The table reorganizer 130 may additionally generate a "new" dynamic table (e.g., a new version of the dynamic table), that may have the same characteristics (e.g., size and/or starting index value) as the old dynamic table. The table reorganizer 130 may insert new header field values of data packets that include the identifier to add a header field value to the dynamic table into the beginning (e.g., at the first index value) of the new dynamic table instead of the old dynamic table. Additionally, any header field values that the table reorganizer 130 determines correspond to specific index values may be inserted into the new dynamic table. Accordingly, the table reorganizer 130 may reorganize the dynamic table without removing any values from the old dynamic table, maintaining the data integrity of the old dynamic table during, and in some cases after, reorganization.

In some embodiments, upon identifying a header field value for an index value in the dynamic table (e.g., the new dynamic table) from the data packet, the table reorganizer 130 may determine the index values of other index values that were in the old dynamic table. For example, upon identifying a header field value for an index value in the new dynamic table, the table reorganizer 130 can compare the header field value to header field values in the old dynamic table. Based on the comparison, the table reorganizer 130 can identify matching header field values to header field values in the old version of the dynamic table. The table reorganizer 130 can identify a subset of header field values of the old version of the dynamic table that are each associated with a higher index value than the index value of the matching header field value in the old version of the dynamic table. The table reorganizer 130 can insert the subset of header field values into the new version of the dynamic table at index values subsequent to the index value the table reorganizer 130 identified as being associated with the determined header field value using heuristics.

For example, prior to detecting the event the table generator 124 may generate a dynamic table that includes header field values for index values 71, 72, 73, 74, and 75. Subsequent to detecting the event, the table reorganizer 130 may receive a data packet that has an index value of 106. Using heuristics on content of the data packet, the table reorganizer 130 may determine a header field value for the index value of 106 for the header field value in a new dynamic table. The table reorganizer 130 may determine the determined header field value matches a header field value corresponding to the index value 71 in the old dynamic table. The table reorganizer 130 may insert the header field value in the new dynamic table at the index value of 106. The table reorganizer 130 may identify header field values that correspond to the index values 72, 73, 74, and 75 in the old dynamic table. The table reorganizer 130 may insert the identified header field values into index values 107, 108, 109, and 110 of the new dynamic table. In some embodiments, the data processing system may subtract the old index value with the new index value (e.g., subtract 71 from 106) to determine a difference between the two index values. The data processing system may then aggregate the determined difference to the index values of the determined header field values in the old dynamic table (e.g., aggregate the difference with each of 72, 73, 74, and 75) to determine the index values for the identified header field values in the new dynamic table. Accordingly, the table reorganizer 130 may move the header field values according to the difference between the initial index value of 71 for the header field value and the new index value of 106 for the header field value.

In some cases, moving individual subsets of header field values to new index values may cause the table reorganizer 130 to remove one or more header field values of the subset. The table reorganizer 130 may do so when the dynamic table has a fixed size and moving the subset would cause one or more of the header field values to have an index value above the fixed size. Continuing with the example above, the dynamic table may have a fixed size with a last index value at 108. Accordingly, when moving the header field values to index values subsequent to 106, the table reorganizer 130 may remove header field values from the dynamic table for which the move would cause the header field values to correspond to index values above 108 (e.g., remove header field values that would correspond with index values 109 and 110). In this way, the table reorganizer 130 may maintain the fixed size of the dynamic table in the case of an event. In some embodiments, the table reorganizer 130 may discard the old dynamic table upon determine or identifying a header field value for each index value in the new dynamic table, thus conserving memory.

The table reorganizer 130 may only move subsets of header field values that correspond to higher index values than an initial index value corresponding to a matched header field value when the matched header field value is matched with a higher new index value. For example, during the event, the two nodes may continue to transmit data packets back and forth and update their corresponding dynamic tables based on data in the data packets. In doing so, the two nodes may remove a header field value from the dynamic table based on the incrementing of index values in the dynamic table and the dynamic table reaching its size limit. The two nodes may then add the header field value back to the beginning of the dynamic table after using the header field value again during communications. However, as with the header field value that exceeded the size limit of the dynamic table and was removed from the dynamic table, each header field value subsequent to the header field value may have been removed as well and may not have been added back to the dynamic table, particularly in the same order. To account for this case, before identifying any subsets of header field values that correspond to higher index values than an initial index value corresponding to a matched header field value, the table reorganizer 130 can compare the new index value for the header field value with the initial index value for the header field value to determine if the new index value is higher than the initial index value. Responsive to determining the new index value is higher than the initial index value, the table reorganizer 130 may identify a subset of header field values corresponding to higher index values. However, responsive to determining the new index value is lower than the initial index value, the table reorganizer 130 may not identify any subset of header field values for further reorganization.

In some embodiments, the table reorganizer 130 may validate the accuracy of the header field values in the dynamic table over time. For example, after inserting one or more header field values into the dynamic table at various index values using heuristics and/or as described herein, the table reorganizer 130 may receive a data packet that includes one of such index values. The table reorganizer 130 may apply heuristics (e.g., the same heuristics) to the content of the data packet to determine a header field value for the data packet. The table reorganizer 130 can compare the determined header field value to the header field value at an index value in the dynamic table matching the index value in the data packet. Responsive to determining the header field values match, the table reorganizer 130 may determine the header field value in the table is correct. Responsive to determining the header field values do not match, the table reorganizer 130 may determine the header field value in the dynamic table is not accurate and replace the header field value in the dynamic table with the determined header field value or only remove the header field value from the dynamic table. Accordingly, the table reorganizer 130 can improve the accuracy of the dynamic table in real time.

In some embodiments, the table reorganizer 130 may maintain and reorganize two dynamic tables (and, in some cases, static tables) for the communication session between the two nodes, a dynamic table for each node. The table reorganizer 130 may reorganize each table using the methods described herein, but only using data packets that were transmitted by the respective nodes to update the nodes' respective tables. For example, upon receiving a data packet, the table reorganizer 130 may identify which of the two nodes transmitted the data packet based on an identifier of the node in the header of the data packet. Responsive to identifying the node, the table reorganizer 130 may update the dynamic table associated with the transmitting node using heuristics and/or as described herein. The table reorganizer 130 may similarly update a table associated with the other node using data from data packets transmitted by the other node. The table reorganizer 130 may do so because the two nodes may lose synchronization at some point during their communication session. Separately maintaining tables for the two nodes may enable the communication session analyzer 110 to accurately generate KPIs using communication from each node separately even when the two nodes lose synchronization with each other.

The table reorganizer 130 may store the table. The table reorganizer 130 may store the table in the memory 120, such as in the table database 126. The table reorganizer 130 may store the table between analyzing data packets. The table reorganizer 130 may do so to determine whether to update the table subsequent to detection of an event or responsive to identifying the header field value for each index value in the dynamic table. The table generator 124 or the table reorganizer 130 may update the dynamic table in real time with new header field values by adding new header field values to the dynamic table (e.g., to the beginning of the dynamic table) that correspond to identifiers in data packets indicating to add the header field values to the dynamic table (respectively incrementing the index values of the header field values in the table in the process). The table generator 124 or the table reorganizer 130 may do so as the table reorganizer 130 is reorganizing the table using heuristics. In this way, the table reorganizer and/or table generator 124 may concurrently update the dynamic table with new values and map index values with header field values after detection of an event.

The KPI generator 134 may comprise programmable instructions that, upon execution, cause the processor 118 to generate KPIs and/or alerts from data (e.g., the payloads and/or headers) of the data packets. Examples of KPIs include, but are not limited to, latency, number of connections, quality of the connections, volume of data transmitted, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The KPI generator 134 may generate the KPIs or alerts for individual communication sessions, geographical areas in which individual nodes that are communicating and receiving data across the network 105 are located, types of devices, etc.

The KPI generator 134 may generate the KPIs or alerts based on data packets stored in the packet database 132. For example, the KPI generator 134 may retrieve data packets from the packet database 132. The headers of the data packets may be compressed according to the HPACK compression protocol. The KPI generator 134 may decompress the headers according to the dynamic and/or static tables generated and/or reorganized by the table generator 124 and/or the table reorganizer 130. By decompressing the headers, the KPI generator 134 may identify the type of data (e.g., the data in the payload) in the data packets and calculate or generate KPIs or alerts for the data packets based on the data packets. The table generator 124 may do so even in instances in which the probe 104 experiences an event. The table reorganizer 130 may reorganize the dynamic tables to be synchronous with the dynamic tables of the nodes using heuristics and/or as described herein. The KPI generator 134 may use the reorganized dynamic tables to decompress data packets in such instances and calculate or generate KPIs or alerts based on data in or associated with the data packets.

The exporter 136 may be or comprise executable instructions that, upon execution by the processor 118, may export generated KPIs or alerts and/or corresponding data to the client device 102. For example, the exporter 136 may create an exportable file (e.g., a file with a format such as BIL, GRD/TAB, PNG, ASKII, KMZ, etc.) from the generated KPIs and transmit the exportable file to the client device 102 for display. The exporter 136 may transmit the exportable file to the client device 102 responsive to a request from the client device 102. In some embodiments, the KPI generator 134 and/or the exporter 138 may generate and/or export KPIs to the client device 102 at set intervals to provide the client device 102 with real-time updates of the performance communication sessions between nodes.

In some embodiments, the exporter 138 may export KPIs that the KPI generator 134 generates based on the data packets of the communication session. The exporter 138 may encapsulate the KPIs into data packets and transmit the data packets to the client device 102 for processing (e.g., for display at a user interface). In some embodiments, the exporter 138 encapsulates and/or transmits the data packets or data from the data packets to the client device 102 without generating KPIs from the data packets or data. In such embodiments, the client device may display the data and/or generate the KPIs itself.

Figure 2:
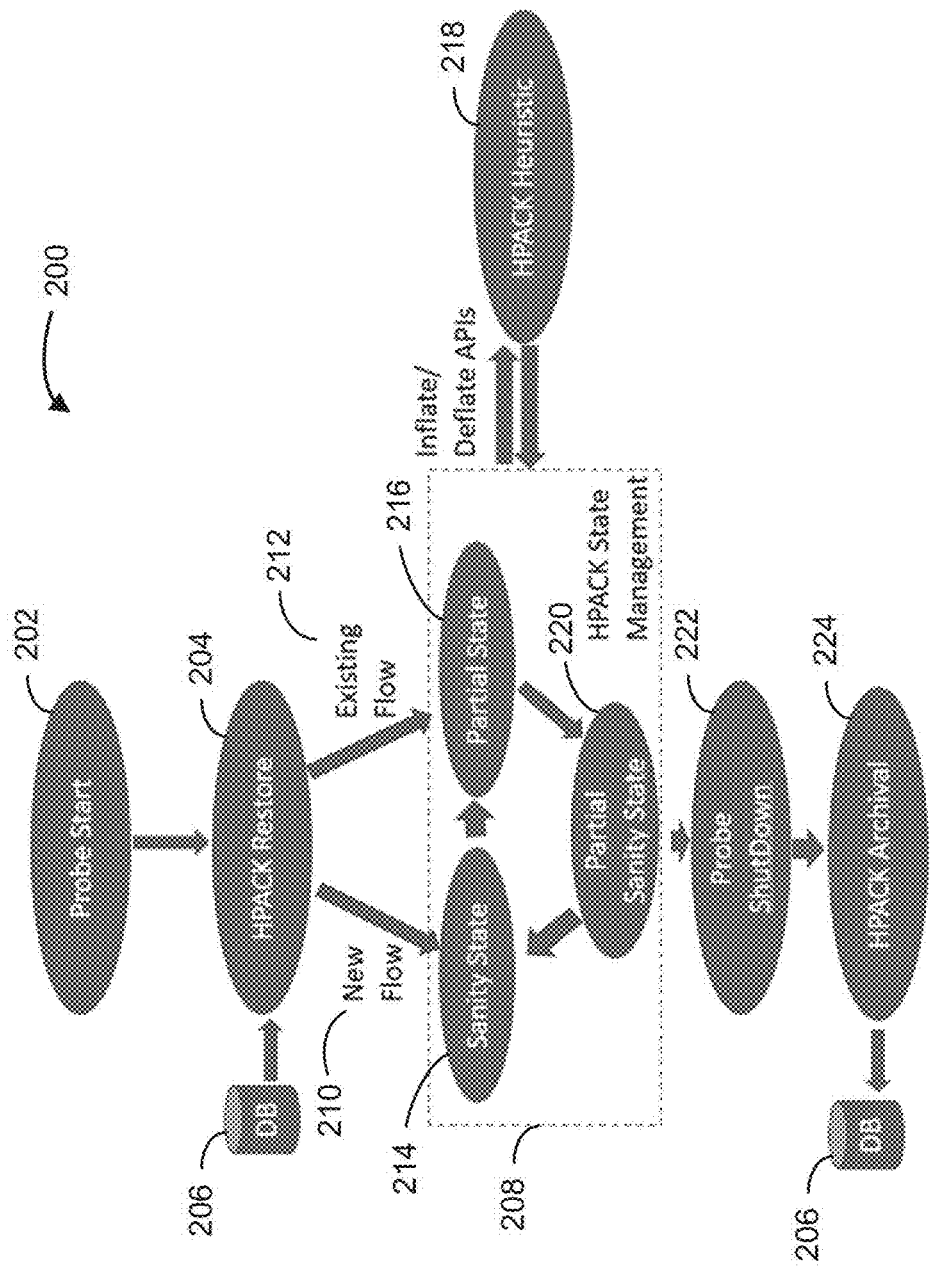
FIG. 2 is a flow diagram of a process for restoring an HPACK table, in accordance with an implementation

FIG. 2 is a flow diagram of a process 200 for restoring an HPACK table, in accordance with an implementation. The process 200 can be performed by a data processing system (a client device, a probe, the communication session analyzer 110, shown and described with reference to FIG. 1, a server system, etc.). The process 200 may include more or fewer operations and the operations may be performed in any order.

At operation 202, a probe (e.g., the probe 104) may start. The probe may start or begin collecting data packets or copies of data packets transmitted between nodes (e.g., two nodes) of a communication session. The probe may start collecting data packets subsequent to experiencing an event that caused the probe to stop collecting data packets from the communication session for a period of time. Examples of such events include, but are not limited to, a probe shutdown and a reboot.

At operation 204, the data processing system can restore an index table (e.g., an HPACK table used for header compression and decompression) for the communication session. The data processing system can restore the index table responsive to receiving data packets from the probe after the operation 202. The index table may be or include a dynamic table and/or a static table the data processing system generated for a communication session between the two nodes. The data processing system can restore the index table by retrieving the index table from a database 206, which can be the same as or similar to the table database 126, shown and described with reference to FIG. 1. The data processing system can retrieve index values for the index table and header field values that correspond to the retrieved index values. The data processing system can retrieve the index values based on the index values and/or the index table having a stored association with an identifier of the communication session between the two nodes in the database 206.

At operation 208, the data processing system may reorganize the dynamic table of the index table. The data processing system may reorganize the dynamic table according to a new flow 210 of data packets and new index values for the new flow 210 of data packets. The data processing system may also reorganize the dynamic table according to an existing flow 212 of data packets and existing index values for the existing flow 212 of data packets. The new flow 210 may correspond to new data packets that the probe collects after the probe starts at operation 202 and that indicate to add new index values to the dynamic table for the communication session between the two nodes. The existing flow 212 may correspond to existing index values and header field values that the data processing system retrieved from the database during operation 204.

In a sanity state 214, all indexes in the dynamic table may be known. The dynamic table may be considered in the sanity state 214 once the data processing system has determined the header field values that correspond to each index value in the dynamic table. The dynamic table may be considered to be in the sanity state 214 until the probe experiences an event and does not collect data packets for a time period and/or after the data processing system uses the techniques described herein to determine each of the header field values that correspond to each index value in the dynamic table. In the sanity state 214, any HTTP/2 headers can be fully encoded and/or decoded with the dynamic table and/or using Huffman decoding techniques. Responsive to the data processing system identifying an unknown index value, the index table may transition into a partial state 216.

In the partial state 216, a portion, but not all, of the index values of the dynamic table may be known. In the partial state 216, the data processing system may receive new data packets from the probe that contain unknown index values (e.g., the index values may be mapped in the tables stored by the nodes of the communication session but not in the dynamic table stored by the data processing system). The data processing system may use heuristics 218 on the content (e.g., the payload) of the new data packets with the unknown index values to determine the header field values of the unknown index values (e.g., inflate the unknown index values). The data processing system may use the heuristics 218 to determine the unknown index values as described herein. Responsive to the data processing system determining at least one new known index (e.g., using heuristics or responsive to adding a header field value to the beginning of the dynamic table responsive to an identifier in a data packet indicating to do so), the dynamic table may transition to a partial sanity state 220.

In the partial sanity state 220, the data processing system may maintain a list or data structure for the index values for which the data processing system knows (e.g., stores a mapping or association with) the corresponding header field values. The data processing system may also store a separate list or data structure for the index values for which the data processing system does not know the corresponding header field values in the partial sanity state 220. The index values for which the data processing system knows the corresponding header field values may be in the sanity state 214. The index values for which the data processing system does not know the corresponding header field values may be in the partial state 216. The data processing system may add new header field values (e.g., header field values identified in data packets to be added to the dynamic table) to the list or data structure of known index values. The data processing system may insert the new header field values at the first index value of the dynamic table (e.g., the first index value after the static table) and increment each known index value of the known index values. The data processing system may continue inserting new index values into the beginning of the dynamic table and determining header field values for index values in the dynamic table the heuristics 218 until determining the header field values for each of the index values in the dynamic table. Upon doing so, the dynamic table may transition into the sanity state 214.

At operation 222, the probe may shut down. The probe may shut down or experience any other event affecting collection of data packets of the communication between the two nodes at the operation 222.

At operation 224, the data processing system may archive the dynamic table in the database 206. The data processing system may archive (e.g., store) the dynamic table responsive to detecting the probe shut down or that the probe is experiencing an event. The data processing system may archive the dynamic table and then return to operation 204 responsive to receiving data packets for the communication session between the two nodes from the probe.

Figure 3:
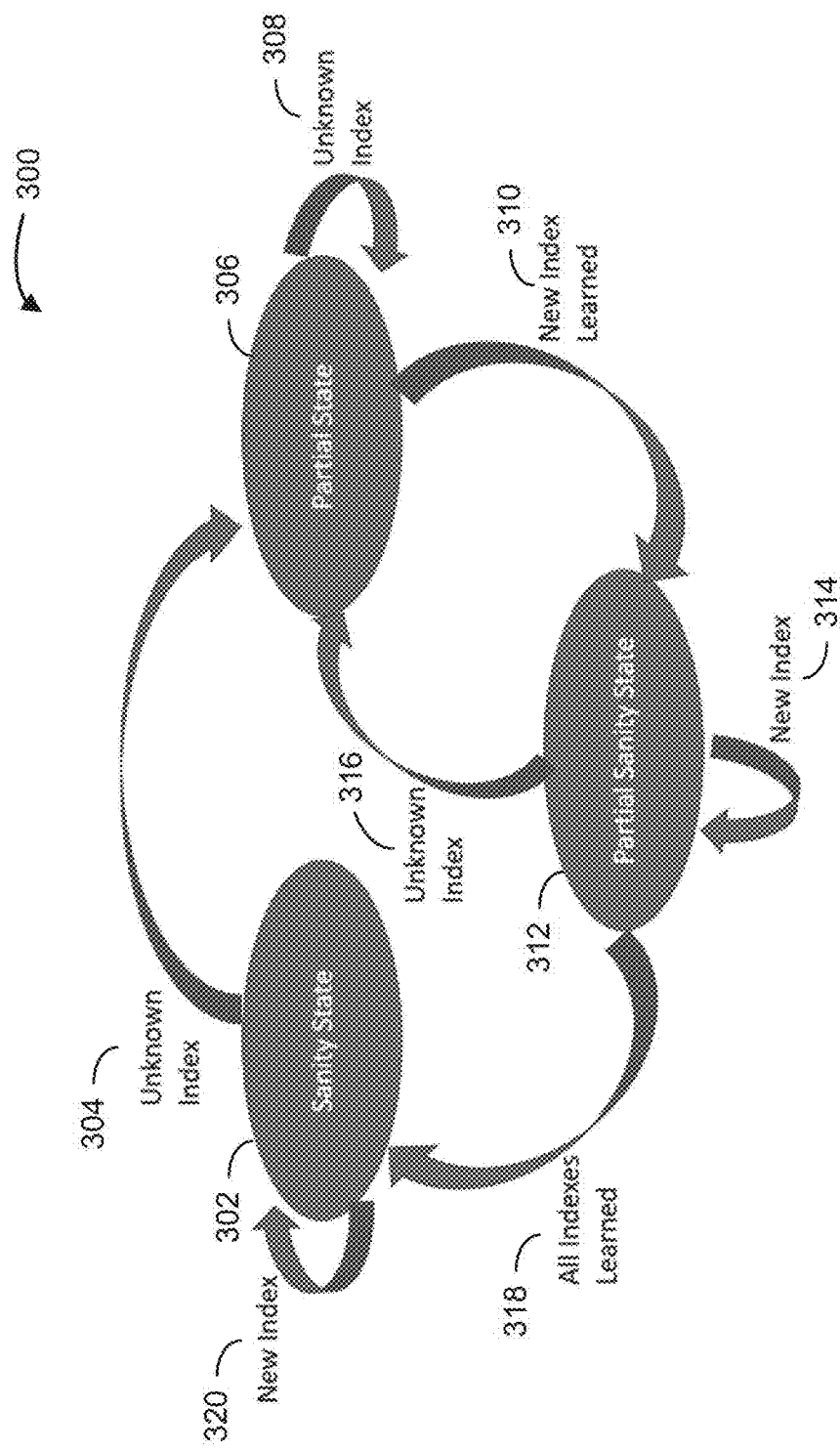
FIG. 3 is a diagram illustrating a flow between states of a dynamic table, in accordance with an implementation.

FIG. 3 is a diagram illustrating a flow 300 between states of a dynamic index table, in accordance with an implementation. The flow 300 may illustrate the change in state of a dynamic table of the HPACK compression protocol, as described with respect to the operation 208, shown and described with reference to FIG. 2. The flow 300 may illustrate the change in state as a data processing system (a client device, a probe, the communication session analyzer 110, shown and described with reference to FIG. 1, a server system, etc.) reorganizes the dynamic table subsequent to a probe collecting data packets for a communication session between two nodes experiencing an event.

In the sanity state 302, all index values of the dynamic table may be known (e.g., each header field value may be known for each index value in the dynamic table). The data processing system may receive an unknown index 304 (e.g., an index value for which the data processing system does not know the corresponding header field value), and the dynamic table may transition into a partial state 306. The data processing system may receive an unknown index 308 and remain in the partial state 306. The data processing system may use heuristics to determine a header field value 310 (e.g., learn an index) for a previously unknown index (e.g., the unknown index 304 or the unknown index 308).

The data processing system may transition into a partial sanity state 312. In the partial sanity state 312, one portion of the index values of the dynamic table are known and another portion of the index values of the dynamic table are not known. Such portions may be stored as separate lists, tables, or data structures. The list of index values of the dynamic table that are known may be in the sanity state 302. Such a list may be stored with associations (e.g., being in the same row of a table) with known header field values for the index values. The list of index values of the dynamic table that are unknown may be in the partial state 306. A list of values in the sanity state 302 may be stored with associations (e.g., stored in the same row of a different table from a table of the list of known index values) with archived or header field values that corresponded to the index values prior to the event that caused the index values to be unknown. The data processing system may add (e.g., insert) new index values 314 and determined index values to the list of known index values. The data processing system may add any unknown index values 316 to the list of unknown index values in the partial state 306.

Upon each index value being learned at 318 (e.g., a header field value for each index value in the dynamic table be associated with an index value or vice versa), the dynamic table (e.g., the entire dynamic table) may transition to the sanity state 302. The data processing system may add new index values 320 to the beginning of the dynamic table in the sanity state.

Figure 4:
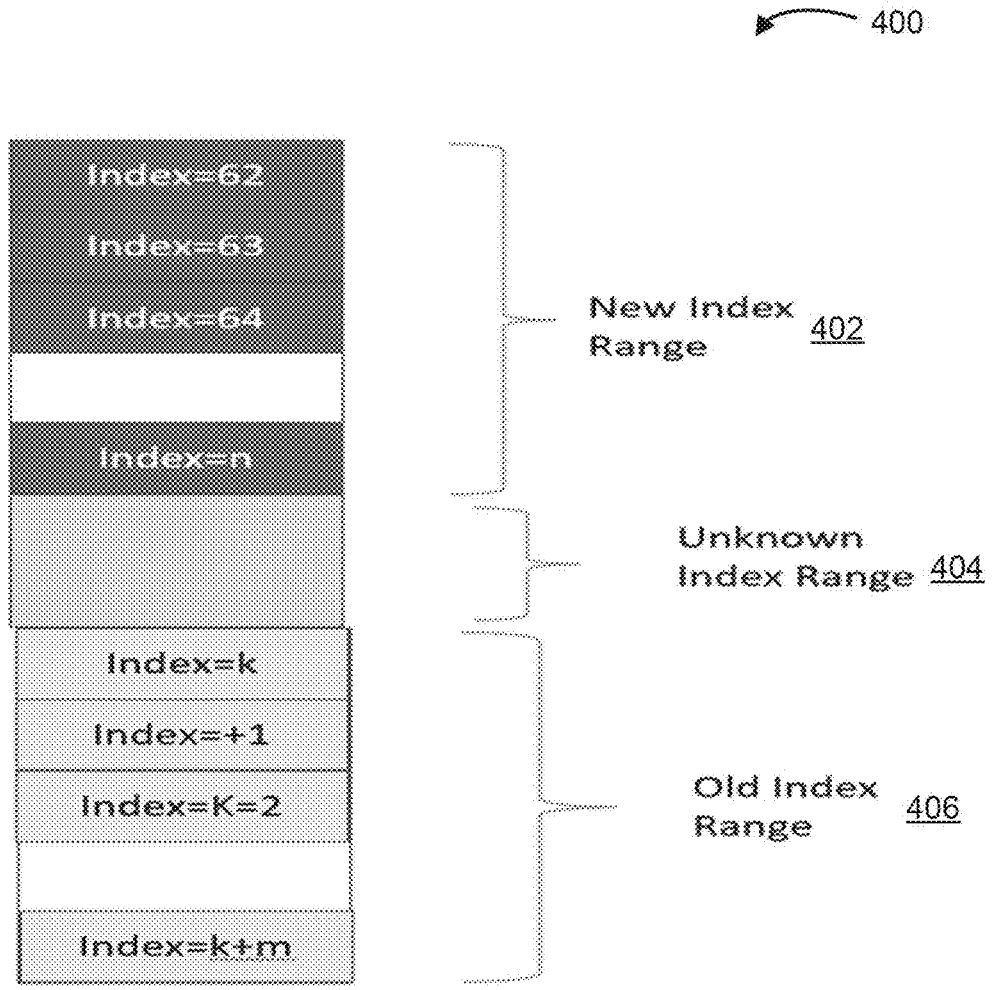
FIG. 4 is an illustration of example groupings of index values of a dynamic table during restoration, in accordance with an implementation.

FIG. 4 is an illustration of example groupings 400 of index values of a dynamic table during restoration, in accordance with an implementation. A data processing system (e.g., a client device, a probe, the communication session analyzer 110, shown and described with reference to FIG. 1, a server system, etc.) may reorganize a dynamic table subsequent to a probe collecting data packets for a communication session between two nodes experiencing an event. In doing so, the data processing system may cause the dynamic table to be in a partial state. When the dynamic table is in the partial state, the data processing system may perform heuristics to determine how to inflate (e.g., associate with header field values in the dynamic table) index values of data packets the data processing system receives from a probe (e.g., the probe 104).

In the partial state, the dynamic table may be fragmented (e.g., stored into different tables or data structures) into a new index range 402, an unknown index range 404, and an old index range 406. In the new index range 402, all new index values may be known and can be inflated within the dynamic table. Index values in the unknown index range 404 may not be known and may not be inflated in the dynamic table. Index values in the old index range 406 may be header field values for index values that are available from the archived values prior to the event, but that cannot be inflated because the data processing system may not know the new index values for the header field values.

The data processing system may execute or implement heuristics to determine a range of known index values. For example, an HTTP2 message can contain the following header fields:

Request
    Method
    Path
    Content-Length
    Content-Type
Response
    Status
    Location-Header The data processing system can determine header field values for index values (e.g., index values for the content length) based on the content of data packets that contain the index values. For example, the data processing system can determine an index value for a header field value for content length by calculating the length of the content in a data packet that contains the index value. In another example, the data processing system may parse data packets for specific words or phrases or for specific content lengths that correspond to header field values of other types of header fields. In another example, the data processing system can heuristically determine header field values for fields such as Method, Path, etc., based on SBI Procedure. For instance, the data processing system may determine a header field value for a Path header to be "/npcf-smpolicycontrol/v1/sm-policies" when a data packet is a data packet of an NPCF SMPolicy Control 5G Message.

Figure 5:
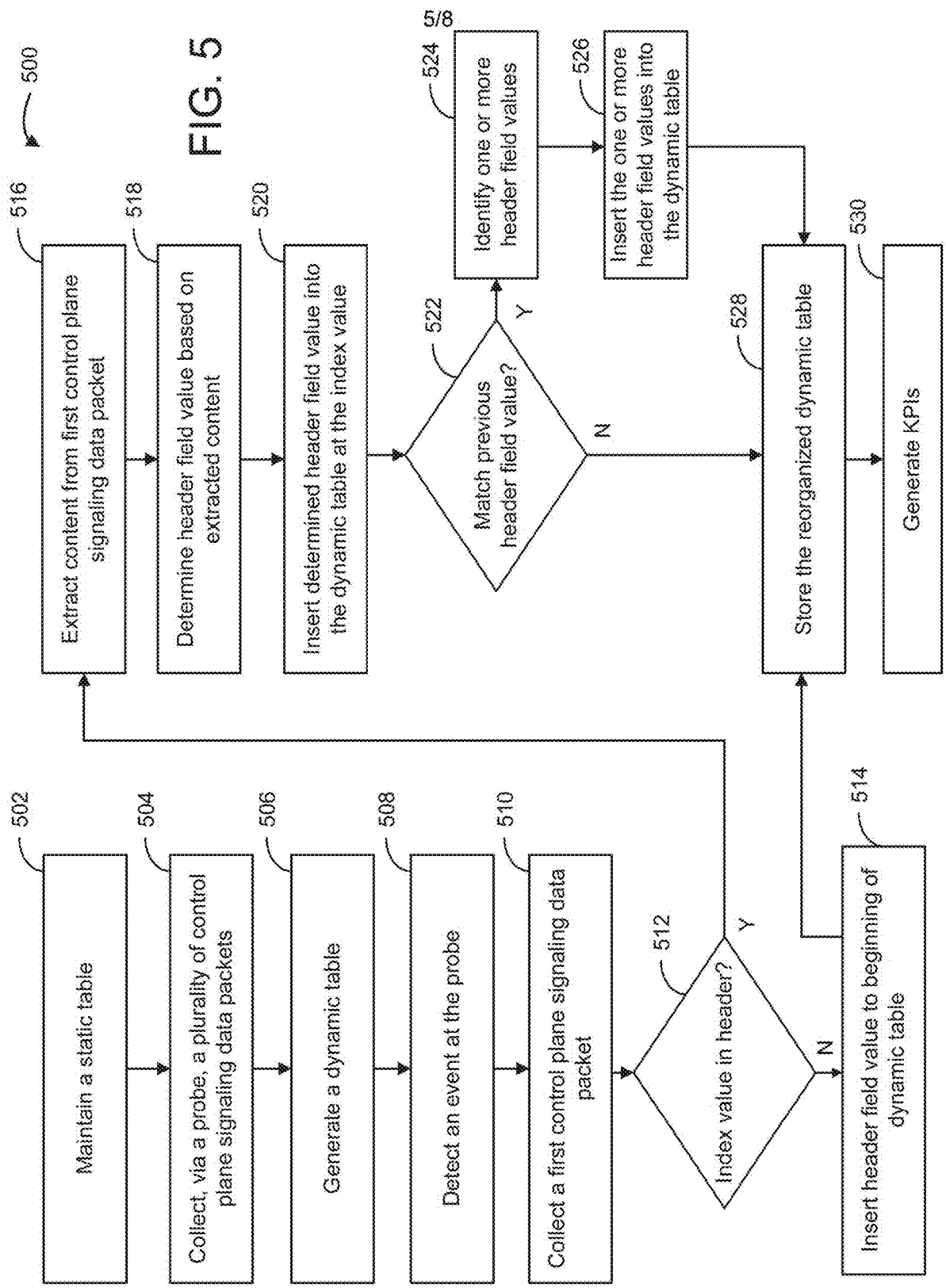
FIG. 5 is a method for HPACK table restoration, in accordance with an implementation.

FIG. 5 is an illustration of a method 500 for is a method for HPACK table restoration, in accordance with an implementation. The method 500 can be performed by a data processing system (a client device, a probe, the communication session analyzer 110, shown and described with reference to FIG. 1, a server system, etc.). The method 500 may include more or fewer operations and the operations may be performed in any order. Performance of the method 500 may enable the data processing system to analyze data packets transmitted between nodes using an HPACK compression protocol in a communication session subsequent to an event that affects the ability of a probe to collect such data packets. Such an event may cause a table maintained by the data processing system to fall out of synchronization with tables stored by the two nodes. The table may enable communication using the HPACK compression protocol. Using heuristics on the payloads of data packets the probe collects subsequent to the event, the data processing system may reorganize the table to generate a new up-to-date table. The new table may match the tables maintained by the two nodes of the communication session, thus enabling the data processing system to parse data from the data packets and generate KPIs using data of the data packets based on the new table.

At operation 502, the data processing system maintains a static table. The static table may be a static table of an HPACK compression protocol. The static table may be or include index values and corresponding header field values for the index values. The static table may have a fixed size. The data processing system may maintain and/or generate a static table that has the same index values and corresponding header field values for each communication session the data processing system monitors. The static table may be used by two nodes of a communication session in which the two nodes use the index values of the static table headers of data packets the two nodes transmit to each other. The nodes may use the index values instead of the header field values that correspond to the index values in the static table because the index values may have fewer characters than the header field values. Accordingly, replacing header field values with index values may save bandwidth over the course of the communication session.

At operation 504, the data processing system collects control plane signaling data (e.g., data packets). Control plane signaling data may include data packets that include data that is transmitted across a network between client devices and various servers, such as service providers. The data packets may each include a device identifier (e.g., an international mobile subscriber identity identifier), a timestamp indicating the time with which the data is associated or generated or the packet is transmitted, a cell identifier, and/or geographic location data of the client device that is transmitting requests and receiving data in response to such requests. In some embodiments, the geographic location data may include longitude and latitude coordinates of the requesting client device (e.g., such as when the client device provides global positioning system data). In some embodiments, the geographic location data may include signal strengths of the signals between the client device and a transceiver antenna or a tower and base station with which the client device transmits signals to make requests and receive the data packets.

The data processing system may collect the control plane signaling data from a control signaling data probe that is configured to receive or collect the control plane signaling data. Such a control signaling probe may collect the control plane signaling data from a network equipment manufacturer (NEM) trace port. In some embodiments, the control signaling probe may collect control plane signaling data at an Evolved Packet Core interface (e.g., the S1-MME interface or the S6a interface) of the network.

At operation 506, the data processing system generates a dynamic table. The data processing system may generate the dynamic table from header field values in the data packets the probe collects from the communication session between the two nodes. The data processing system may generate the dynamic table by identifying identifiers in the headers of the data packets that indicate to add a header field value in the data packet to the dynamic table. The data processing system may insert the header field values that correspond to such identifiers in the data packets into the beginning of the dynamic table. In doing so, the data processing system may associate the header field values with the lowest index value of the dynamic table and increment the index value of each header field value that is currently in the dynamic table. In cases in which the dynamic table has a fixed size, the data processing system may remove any header field values from the dynamic table for which the incrementing causes the header field values to correspond to an index value exceeding the fixed size (or the maximum header field value) of the dynamic table. By maintaining the dynamic table in this way, the data processing system may use the dynamic table to decompress headers of data packets transmitted between the two nodes to use the data in the data packets to generate KPIs.

At operation 508, the data processing system detects an event at the probe. The event may be a reboot or a shutdown of the probe or any other event that affects the probe's ability to collect data packets from the communication session. The data processing system may detect the event responsive to receiving a message or signal from the probe indicating the event or responsive to receiving a message indicating the event from a client device in communication with the data processing system. In some embodiments, the data processing system may detect the event by determining the event. The data processing system may determine the event by determining the data processing system has not received a data packet for the communication for a time period exceeding a threshold. For example, subsequent to receiving a data packet from the probe for the communication session, the data processing system may maintain and increment a counter or timer for each second or other time frame until receiving another data packet from the probe for the communication session. Responsive to determining the count of the counter or the time of the timer exceeds the threshold, the data processing system may determine an event occurred at the probe.

At operation 510, the data processing system collects a first control plane signaling data packet. The data processing system may collect the first control plane signaling data packet from the probe. The data processing system may collect the first control plane signaling data packet from the probe subsequent to detecting the event in operation 508. For example, after shutting down during the event, the probe may boot up and continue collecting data packets from the communication session between the two nodes to collect the first control plane signaling data packet.

At operation 512, the data processing system determines whether an index value is in the header of the first control plane signaling data packet. The data processing system may determine whether there is an index value in the header of the first control plane signaling data packet by parsing the header. The data processing system may parse the header to determine whether there is an identifier in the header indicating to add a header field value in the header to the dynamic table.

Responsive to identifying an identifier in the header indicating to add a header field value in the header to the dynamic table, at operation 514, the data processing system inserts the header field value in the header into the dynamic table. In doing so, the data processing system may insert the header field value into the beginning of the dynamic table. The data processing system may insert the header field value into the beginning of the dynamic table by associating the header field value with the first or lowest index value of the dynamic table. The data processing system may increment each preexisting dynamic field value in the dynamic table, responsive to inserting the header field value into the beginning of the dynamic table.

Responsive to determining there is an index value in the first control plane signaling data packet at operation 512, and, in some cases, responsive to determining there is not an identifier indicating to add header field value to the dynamic table, at operation 516, the data processing system may extract content from the first control plane signaling data packet. The data processing system may extract content from the first control plane signaling data packet by extracting values in the payload or other fields of the first control plane signaling data packet. The data processing system may extract such content by copying the content into memory.

At operation 518, the data processing system determines a header field value for the first control plane signaling data packet based on the extracted content. The data processing system may determine the header field value based on the extracted content by applying one or more heuristics to the extracted content. One example of a heuristic includes determining whether a length of the content is a specific value or exceeds or is less than a defined threshold. Another example of a heuristic includes determining whether the content includes a specific value (e.g., word, phrase, symbol, or multiple symbols) or specific characteristic (e.g., has a specific format or time between collection or transmission of a previous or subsequent data packet). The data processing system may apply any such heuristics to data packets or content of data packets to determine header field values that correspond with index values of such data packets.

At operation 520, the data processing system inserts the determined header field value into the dynamic table. The data processing system may insert the header field value at the index value of the dynamic table. In some cases, in doing so, the data processing system may remove a header field value that was previously at the index value (e.g., previously associated with or corresponding with the header field value) and insert the determined header field value in place of the removed header field value. The data processing system may store the data packet and/or content extracted from the data packet in memory.

At operation 522, the data processing system determines if the determined header field value of the first control signaling data packet matches a header field value of the dynamic prior to detecting the event. The data processing system may do so by comparing the determined header field value with header field values associated with indexes of the dynamic table prior to the detection of the event. The comparison may indicate whether the header field value was in the dynamic table prior to the event and/or a change or difference in index values between the time before the event and the time after the event.

Responsive to determining the determined header field value matches a header field value in the dynamic table from before the event, at operation 524, the data processing system identifies one or more header field values. The data processing system may identify one or more header field values of the dynamic table from before the event that correspond to the higher index values than the index value of the matching header field value in the dynamic table from before the event (e.g., an old version of the dynamic table). The data processing system may extract the one or more header field values of the dynamic table from before the event responsive to identifying the one or more header field values.

At operation 526, the data processing system inserts the one or more header field values into the dynamic table. The data processing system may insert the one or more header field values into the dynamic table (e.g., a new version of the dynamic table) at index values subsequent to the index value of the determined header field value of the first control signaling data packet. In doing so, the data processing system may determine if the insertion will cause the header field values to correspond to index values exceeding a maximum index value of the dynamic table. Responsive to determining the insertion will cause one or more of the header field values to correspond with an index value exceeding the maximum index value, the data processing system may remove the header field values from the dynamic table or otherwise not add the header field values to the dynamic table. In this way, the data processing system may identify header field values to insert into the dynamic table in batches, conserving processing resources by avoiding using heuristics to determine header field values for index values that were already moved or inserted into the dynamic table.

At operation 528, the data processing system stores the reorganized dynamic table. The data processing system may store the reorganized dynamic table in memory (e.g., in a database). The data processing system may store the reorganized dynamic table subsequent to adding individual header field values to the dynamic table. The data processing system may retrieve the dynamic table at each instance the data processing system determines a header field value for the dynamic table and/or otherwise inserts a new header field value into the dynamic database. Accordingly, the dynamic table may be used by the data processing system to decompress data packets transmitted between the two nodes to determine KPIs for the communication session.

The data processing system may repeat operations 510-528 for each control plane signaling data packet the data processing system receives from the two nodes after detecting the event. The data processing system may retrieve the dynamic table for each data packet and determine whether and/or how to update or reorganize the dynamic table based on the data packet following the operations 510-528. Accordingly, the data processing system may gradually reorganize the dynamic table until identifying the correct header field value for each index value in the dynamic table (e.g., reaching a sanity state).

The data processing system may use the same or one or more other probes to monitor any number of communication sessions between nodes. The data processing system may store and maintain a dynamic table (and a static table) for each communication session. The data processing system may perform the operations 504-528 for each communication session to establish and reestablish synchronization of the dynamic table with the dynamic tables maintained by nodes of the different communication sessions. The data processing system may store the data packets and/or content extracted from the data packets in memory. Thus, the data processing system may be able to generate KPIs from data of data packets across multiple communication sessions.

At operation 530, the data processing system generates KPIs and/or alerts. The data processing system may generate KPIs and/or alerts based on the stored data packets and/or content extracted from the data packets. The data processing system may generate the KPIs and/or alerts based on the reorganized dynamic table. For example, the data processing system may use the reorganized table to identify the type of content that is included in newly collected data packets transmitted across the communication session. Based on the identified type of content, the data processing system may generate KPIs such as a mean opinion score, packet jitter, packet loss, latency, delay, among other metrics of the communication session signals that are transmitted between the two nodes. The data processing system may generate any KPIs. The data processing system may generate alerts such as alerts indicating a security breach. The data processing system may do so by analyzing the QoS data of the communication session for which the data processing system is generating the KPIs and/or alerts. The data processing system may generate values for the KPIs and/or alerts using any method.

Figure 6A:
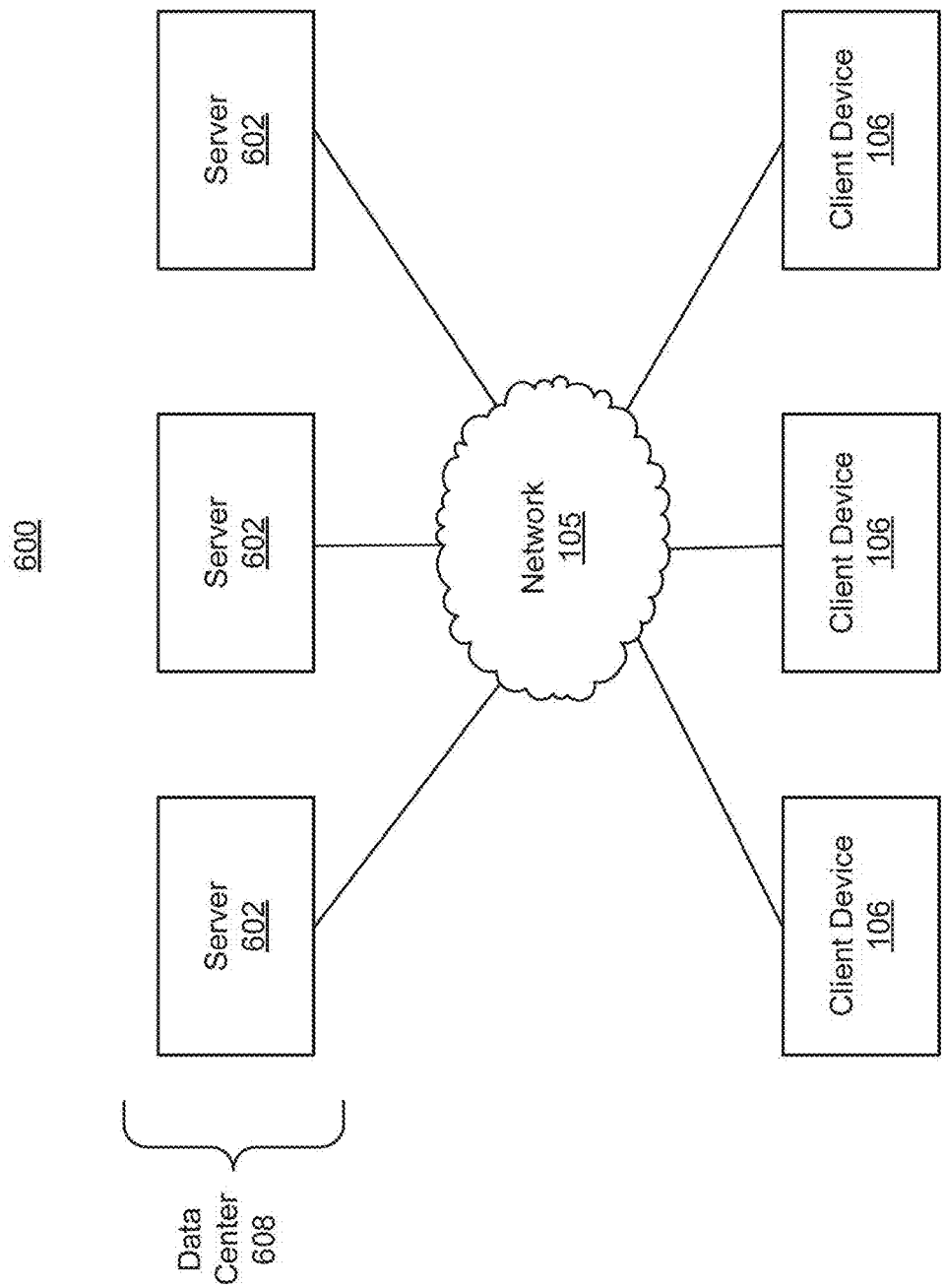
FIG. 6A is a block diagram depicting an implementation of a network environment including a client device in communication with a server device.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g. Software as a Service (SaaS) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 602 can be deployed as and/or executed on any type and form of computing device, e.g. a computer, network device or appliance capable of communicating on any type and form of network and performing the operations described herein.

Figure 6C:
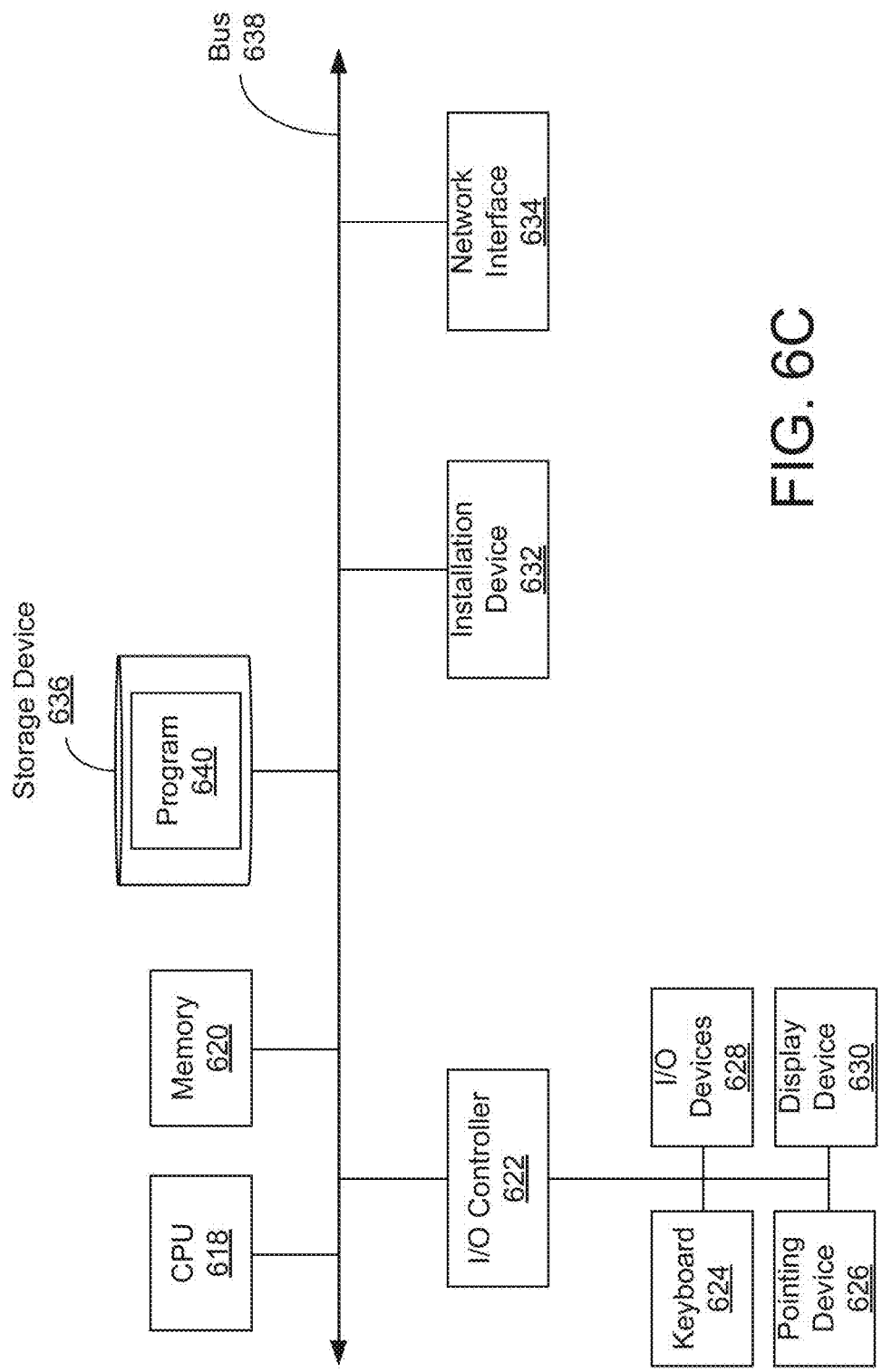
FIG. 6C is a block diagram depicting an implementation of a computing device that can be used in connection with the systems depicted in FIGS. 1, 6A and 6B and the method depicted in FIG. 5.

FIG. 6C depicts block diagrams of a computing device 603 useful for practicing an embodiment of the client 106 or a server 602. As shown in FIG. 6C, each computing device 603 can include a central processing unit 618, and a main memory unit 620. As shown in FIG. 6C, a computing device 603 can include one or more of a storage device 636, an installation device 632, a network interface 634, an I/O controller 622, a display device 630, a keyboard 624 or a pointing device 626, e.g. a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 603 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 603. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 603. In embodiments, the computing device 603 can provide USB connections (not shown) to receive handheld USB storage devices. In embodiments, an I/O device 628 can be a bridge between the system bus 638 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 603. For example, the computing device 603 can include any type and/or form of video adapter, video card, driver, and/or library to interface, communicate, connect or otherwise use the display devices 630. In embodiments, a video adapter can include multiple connectors to interface to multiple display devices 630.

The computing device 603 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIGS. 1, 2A, 2B, 2C or 2D. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 603 via a bus 638. Storage device 636 can be external and connect to the computing device 603 via an I/O device 630 that provides an external bus. Storage device 636 can connect to the computing device 603 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 603 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 603 can communicate with other computing devices 603 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 603 to any type of network capable of communication and performing the operations described herein.

A computing device 603 of the sort depicted in FIG. 6C can operate under the control of an operating system, which controls scheduling of tasks and access to system resources. The computing device 603 can be running any operating system configured for any type of computing device, including, for example, a desktop operating system, a mobile device operating system, a tablet operating system, or a smartphone operating system.

The computing device 603 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 603 has sufficient processor power and memory capacity to perform the operations described herein. In some embodiments, the computing device 603 can have different processors, operating systems, and input devices consistent with the device.

In embodiments, the status of one or more machines 106, 602 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 603 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 603 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The description relates to a network monitoring system that may implement a probe to collect data packets that are transmitted across communication sessions. The probe may only collect the data packets (or copies of the data packets) and may not directly communicate or transmit messages in data packets to the nodes of the communication sessions. A computer of the network monitoring system may generate key performance indicators (KPIs) from the data packets collected by the probe. The computer may maintain and update a dynamic table and static table for a communication session to be synchronous with the tables maintained and updated by the nodes of the communication session. Accordingly, the computer may use the updated dynamic table to accurately parse the data and/or contents of the data packets to generate KPIs based on the data and/or content of the data packets.

The probe may experience an event (e.g., a shutdown or a reboot) while monitoring a communication session between the nodes. The event may cause a temporary inability of the probe to collect data packets from the communication session. Because the probe is not actively communicating with the two nodes, however, the two nodes may continue transmitting data packets between each other, updating their respective dynamic tables for the communication session in the process. When the probe becomes live, powered on, and/or active and begins collecting data packets from the communication session again, the dynamic table stored by the computer of the network monitoring system may no longer be synchronous with the dynamic tables of the nodes. Accordingly, the computer may not be able to accurately parse the data in the data packets of the communication session.

A computer implementing the systems and methods described herein may overcome the aforementioned technical deficiencies. Upon detecting the event and receiving data packets from the probe again, the computer may operate to reorganize the table according to new data packets the computer receives from the communication session. To do so, the computer may use heuristics to analyze the content (e.g., the payloads and/or other field values) of the data packets to identify the header field values for index values in the data packets. The computer may update the dynamic table for the communication session based on the determined header field values and the index values that correspond to the header field values. The computer may update the dynamic table by adding the new header field values to the dynamic table. The computer may decompress the header field values using the reorganized or updated table to generate KPIs.

At least one aspect of a technical solution to the aforementioned problem is directed to a method. The method may comprise maintaining, by one or more processors, a static table comprising a list of header field values and a static index value for each of the header field values; collecting, by the one or more processors via a probe from a communication channel between a first node and a second node, a plurality of control plane signaling data packets comprising a plurality of header field values; generating, by the one or more processors, a dynamic table from one or more header field values of the plurality of header field values, each header field value of the dynamic table corresponding to a dynamic index value in the dynamic table; detecting, by the one or processors, an event occurring at the probe affecting collection of control plane signaling data packets from the communication channel; subsequent to detecting the event, collecting, by the one or more processors via the probe, a first control plane signaling data packet comprising a first index value in a header of the first control plane signaling data packet; reorganizing, by the one or more processors, the dynamic index values in the dynamic table based on the first index value and responsive to the detecting the event to generate a reorganized dynamic table; and storing, by the one or more processor, the reorganized dynamic table in memory.

At least one aspect of this technical solution is directed to a system. The system may comprise one or more processors. The one or more processors may be in communication with a probe monitoring a communication channel between a first node and a second node. The one or more processors may maintain a static table comprising a list of header field values and a static index value for each of the header field values; collect, via a probe from a communication channel between a first node and a second node, a plurality of control plane signaling data packets comprising a plurality of header field values; generate a dynamic table one or more header field values of the plurality of header field values, each header field value of the dynamic table corresponding to a dynamic index value in the dynamic table; detect an event occurring at the probe affecting collection of control plane signaling data packets from the communication channel; subsequent to detecting the event, collect, via the probe, a first control plane signaling data packet comprising a first index value in a header of the first control plane signaling data packet; reorganize the dynamic index values in the dynamic table based on the first index value and responsive to the detecting the event to generate a reorganized dynamic table; and store the reorganized dynamic table in memory.

At least one aspect of this technical solution is directed to a non-transitory computer-readable storage medium storing executable instructions that, when executed by one or more processors, cause the one or more processors to maintain a static table comprising a list of header field values and a static index value for each of the header field values; collect, via a probe from a communication channel between a first node and a second node, a plurality of control plane signaling data packets comprising a plurality of header field values; generate a dynamic table from one or more of the plurality of header field values, each header field value of the dynamic table corresponding to a dynamic index value in the dynamic table; detect an event occurring at the probe affecting collection of control plane signaling data packets from the communication channel; subsequent to detecting the event, collect, via the probe, a first control plane signaling data packet comprising a first index value in a header of the first control plane signaling data packet; reorganize the dynamic index values in the dynamic table based on the first index value and responsive to the detecting the event to generate a reorganized dynamic table; and store the reorganized dynamic table in memory.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the communication session analyzer 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   maintaining, by one or more processors, a static table comprising a list of header field values and a static index value for each of the header field values;
   collecting, by the one or more processors via a probe from a communication channel between a first node and a second node, a plurality of control plane signaling data packets comprising a plurality of header field values;
   generating, by the one or more processors, a dynamic table from one or more header field values of the plurality of header field values, each header field value of the dynamic table corresponding to a dynamic index value in the dynamic table;
   detecting, by the one or processors, an event occurring at the probe affecting collection of control plane signaling data packets from the communication channel;
   subsequent to detecting the event, collecting, by the one or more processors via the probe, a first control plane signaling data packet comprising a first index value in a header of the first control plane signaling data packet;
   reorganizing, by the one or more processors, the dynamic index values in the dynamic table based on the first index value and responsive to the detecting the event to generate a reorganized dynamic table; and
   storing, by the one or more processor, the reorganized dynamic table in memory.

2. The method of claim 1, further comprising:
   subsequent to detecting the event, collecting, by the one or more processors, a second plurality of control plane signaling data packets comprising a plurality of index values;
   comparing, by the one or more processors, the plurality of index values to the reorganized dynamic table; and
   generating, by the one or more processors, key performance indicators regarding the second plurality of control plane signaling data packets based on the comparison of the plurality of index values to the reorganized dynamic table.

3. The method of claim 1, further comprising:
   determining, by the one or more processors, a first header field value for the first control plane signaling data packet by applying a heuristic to content of the first control plane signaling data packet,
   wherein reorganizing the dynamic index values in the dynamic table comprises inserting, by the one or more processors, the determined header field value into the dynamic table at a first dynamic index value in the dynamic table that matches the first index value of the first control plane signaling data packet.

4. The method of claim 3, wherein reorganizing the dynamic index values in the dynamic table comprises:

identifying, by the one or more processors, a second index value in the dynamic table that corresponds to a header field value matching the determined first header field value;

identifying, by the one or more processors, one or more dynamic index values in the dynamic table higher than the second index value; and moving, by the one or more processors, header field values of the one or more dynamic index values to correspond to different dynamic index values of the dynamic table according to a difference between the second dynamic index value and the first dynamic index value.

5. The method of claim 3, wherein reorganizing the dynamic index values in the dynamic table comprises:

identifying, by the one or more processors, a second index value in the dynamic table that corresponds to a header field value matching the determined first header field value; and removing, by the one or more processors, the header field value that corresponds to the second index value from the dynamic table.

6. The method of claim 3, wherein determining the first header field value for the first control plane signaling data packet comprises:

determining, by the one or more processors, the first header field value to be for a method field, a path field, a content-length field, a content-type field, a status field, or a location field.

7. The method of claim 1, further comprising:

determining, by the one or more processors, a first header field value for the first control plane signaling data packet by applying a heuristic to content of the first control plane signaling data packet.

8. The method of claim 7, wherein applying the heuristic to the content of the first control plane signaling data packet comprises:

determining, by the one or more processors, a length of the content of the first control plane signaling data packet; and selecting, by the one or more processors, the first header field value from a plurality of header field values based on the determined length of the content.

9. The method of claim 7, wherein applying the heuristic to the content of the first control plane signaling data packet comprises:

selecting, by the one or more processors, the first header field value from a plurality of header field values based on an extracted value from the content of the first control plane signaling data packet.

10. The method of claim 1, wherein the dynamic table is a first dynamic table corresponding to data packets transmitted by the first node to the second node across the communication channel, and further comprising:

generating, by the one or more processors, a second dynamic table corresponding to data packets transmitted by the second node to the first node across the communication channel.

11. The method of claim 1, wherein detecting the event comprises detecting, by the one or more processors, a reboot of the probe.

12. The method of claim 1, further comprising:

receiving, by the one or more processors from the probe, a second control plane signaling data packet comprising a second header field value comprising an identifier indicating to add a new header field value to the dynamic table in a header of the second control plane signaling data packet;

incrementing, by the one or more processors, each index value of the reorganized dynamic table in response to receiving the second control plane signaling data packet; and subsequent to the incrementing and responsive at least to the second control plane signaling data packet comprising the identifier, adding, by the one or more processors, a second dynamic index value and the second header field value to the beginning of the dynamic table.

13. The method of claim 12, further comprising:

identifying, by the one or more processors, a highest dynamic index value in the dynamic table, the highest dynamic index value corresponding to a third header field value; and in response to identifying the highest dynamic index value, removing, by the one or more processors, the third header field value based on the identification of the highest dynamic index.

14. The method of claim 1, wherein generating the dynamic table comprises appending the dynamic table to the end of the static table.

15. A system, comprising:

one or more processors, coupled to memory, to:

maintain a static table comprising a list of header field values and a static index value for each of the header field values;

collect, via a probe from a communication channel between a first node and a second node, a plurality of control plane signaling data packets comprising a plurality of header field values;

generate a dynamic table one or more header field values of the plurality of header field values, each header field value of the dynamic table corresponding to a dynamic index value in the dynamic table;

detect an event occurring at the probe affecting collection of control plane signaling data packets from the communication channel;

subsequent to detecting the event, collect, via the probe, a first control plane signaling data packet comprising a first index value in a header of the first control plane signaling data packet;

reorganize the dynamic index values in the dynamic table based on the first index value and responsive to the detecting the event to generate a reorganized dynamic table; and store the reorganized dynamic table in memory.

16. The system of claim 15, wherein the one or more processors further:

collect a second plurality of control plane signaling data packets comprising a plurality of index values;

compare the plurality of index values to the reorganized dynamic table; and generate key performance indicators regarding the second plurality of control plane signaling data packets based on the comparison of the plurality of index values to the reorganized dynamic table.

17. The system of claim 15, wherein the one or more processors further:

determine a first header field value for the first control plane signaling data packet by applying a heuristic to content of the first control plane signaling data packet, wherein the one or more processors reorganize the dynamic index values in the dynamic table by inserting the determined header field value into the dynamic table at a first dynamic index value in the dynamic table that matches the first index value of the first control plane signaling data packet.

18. The system of claim 17, wherein the one or more processors reorganize the dynamic index values in the dynamic table by:
identifying a second index value in the dynamic table that corresponds to a header field value matching the determined first header field value;
identifying one or more dynamic index values in the dynamic table higher than the second index value; and
moving header field values of the one or more dynamic index values to correspond to different dynamic index values of the dynamic table according to a difference between the second dynamic index value and the first dynamic index value.

19. A non-transitory computer readable storage medium comprising instructions stored thereon that, when executed by one or more processors, cause the one or more processors to:
maintain a static table comprising a list of header field values and a static index value for each of the header field values;
collect, via a probe from a communication channel between a first node and a second node, a plurality of control plane signaling data packets comprising a plurality of header field values;
generate a dynamic table from one or more of the plurality of header field values, each header field value of the dynamic table corresponding to a dynamic index value in the dynamic table;
detect an event occurring at the probe affecting collection of control plane signaling data packets from the communication channel;
subsequent to detecting the event, collect, via the probe, a first control plane signaling data packet comprising a first index value in a header of the first control plane signaling data packet;
reorganize the dynamic index values in the dynamic table based on the first index value and responsive to the detecting the event to generate a reorganized dynamic table; and
store the reorganized dynamic table in memory.

20. The medium of claim 19, comprising instructions stored thereon that, when executed by the one or more processors, cause the one or more processors to:
collect a second plurality of control plane signaling data packets comprising a plurality of index values;
compare the plurality of index values to the reorganized dynamic table; and
generate key performance indicators regarding the second plurality of control plane signaling data packets based on the comparison of the plurality of index values to the reorganized dynamic table.

* * * * *